US012717506B2

(12) United States Patent
Bert

(10) Patent No.: US 12,717,506 B2
(45) Date of Patent: Aug. 25, 2026

(54) SCALABLE WRITE AMPLIFICATION MEASUREMENT

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/015,054

(22) Filed: Jan. 9, 2025

(65) Prior Publication Data

US 2025/0231703 A1 Jul. 17, 2025

Related U.S. Application Data

(60) Provisional application No. 63/620,000, filed on Jan. 11, 2024.

(51) Int. Cl.
*G06F 3/06* (2006.01)

(52) U.S. Cl.
CPC .......... *G06F 3/0634* (2013.01); *G06F 3/0616* (2013.01); *G06F 3/0659* (2013.01); *G06F 3/0679* (2013.01)

(58) Field of Classification Search
CPC .... G06F 3/0634; G06F 3/0616; G06F 3/0659; G06F 3/0679; G06F 3/0653; G06F 12/02;
(Continued)

(56) References Cited

U.S. PATENT DOCUMENTS 10,628,301 B1 4/2020 Ben-Yehuda et al.
2013/0061019 A1* 3/2013 Fitzpatrick .......... G06F 11/3409 711/173

(Continued)

FOREIGN PATENT DOCUMENTS

CN 116069587 A * 5/2023 .......... G06F 11/3037

OTHER PUBLICATIONS

Sun et al. "Measuring and Analyzing Write Amplification Characteristics of Solid State Disks," 2013 IEEE 21st International Symposium on Modelling, Analysis & Simulation of Computer and Telecommunication Systems, pp. 212-221 (Year: 2013).*

(Continued)

*Primary Examiner* — Michael Krofcheck
(74) *Attorney, Agent, or Firm* — Schwegman Lundberg & Woessner, P.A.

(57) ABSTRACT

The disclosure configures a memory sub-system controller to perform scalable write amplification (WAF) measurement. The controller receives a request to place a memory sub-system into a WAF mode and, in response, reduces a full capacity of the memory sub-system to a reduced capacity by restricting write operations to an individual portion of a set of memory components. The controller generates a log that tracks a number of write operations performed to store data to the individual portion of the set of memory components relative to a plurality of requests to program the data to the individual portion of the memory sub-system. The controller computes, based on the log, the WAF for the full capacity of the memory sub-system based on the WAF of the reduced capacity of the memory sub-system.

20 Claims, 7 Drawing Sheets

(58) Field of Classification Search
CPC ............... G06F 12/023; G06F 12/0238; G06F 12/0246; G06F 12/0253
See application file for complete search history.

(56) References Cited

U.S. PATENT DOCUMENTS

| | | | | |
|---|---|---|---|---|
| 2018/0018113 | A1 | 1/2018 | Koseki et al. | |
| 2019/0332311 | A1 | 10/2019 | Shin | |
| 2019/0354473 | A1 | 11/2019 | Bahirat et al. | |
| 2022/0283720 | A1 | 9/2022 | Kim et al. | |
| 2022/0350489 | A1 * | 11/2022 | Kanno | G06F 3/0644 |
| 2025/0147670 | A1 * | 5/2025 | Bernat | G06F 11/3409 |

OTHER PUBLICATIONS

Sun et al. “RB-Explorer: An Accurate and Practical Approach to Write Amplification Measurement for SSDs,” IEEE Transactions on Computers, vol. 64, No. 4, Apr. 2015, pp. 1133-1148 (Year: 2015).*
“International Application Serial No. PCT US2025 010943, International Search Report mailed Apr. 18, 2025”, 3 pages.
“International Application Serial No. PCT US2025 010943, Written Opinion mailed Apr. 18, 2025”, 3 pages.

* cited by examiner

SCALABLE WRITE AMPLIFICATION MEASUREMENT

PRIORITY APPLICATION

This application claims the benefit of priority to U.S. Provisional Application Ser. No. 63/620,000, filed Jan. 11, 2024, which is incorporated herein by reference in its entirety.

TECHNICAL FIELD

Examples of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
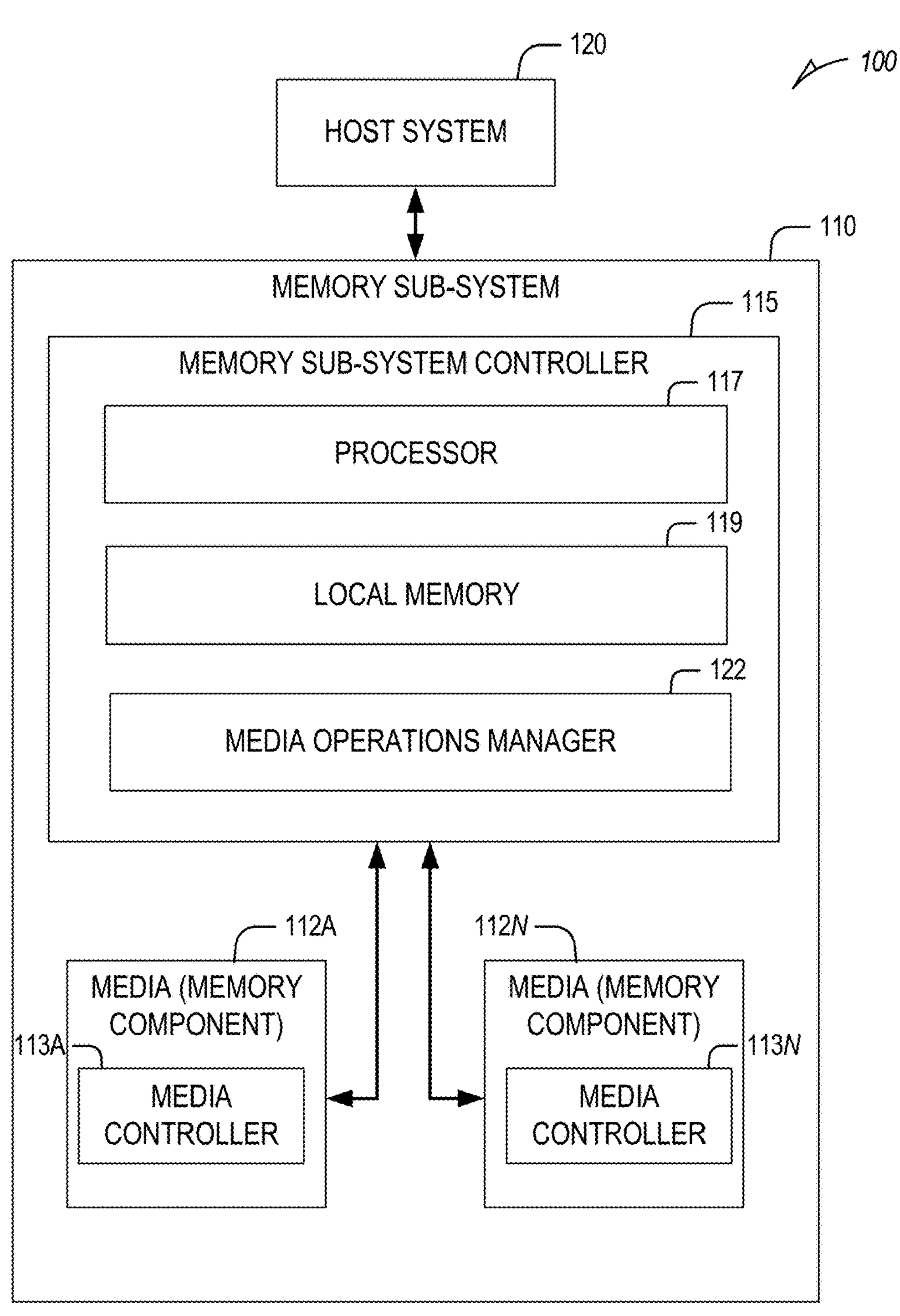
FIG. 1 is a block diagram illustrating an example computing environment including a memory sub-system, in accordance with some examples of the present disclosure.

Examples of the present disclosure configure a system component, such as a memory sub-system controller (and/or host), to compute WAF of a memory sub-system (e.g., an SSD) in a scalable manner. Specifically, the disclosed techniques can receive a command to place the memory sub-system into a WAF mode. In response, the memory sub-system reduces a reported and usable capacity of the memory sub-system from a full capacity to a reduced capacity. For example, the memory sub-system can compute a size of the reduced capacity and uniformly allocate an amount of memory components (e.g., physical portions of each memory die and each channel of the memory sub-system) corresponding to the size of the reduced capacity. The amount of memory components that are allocated for the reduced capacity is smaller than the amount of memory components allocated for the full capacity of the memory sub-system.

The memory sub-system can receive requests from a host (or some other controller) to write data to the memory sub-system and can restrict writing the data to only the amount of memory components allocated for the reduced capacity. After a specified amount of data has been written to the reduced capacity memory sub-system, a WAF can be computed as a function of the number of requests to write the data received from the host and the number of writes actually performed on the allocated amount of memory components. This WAF can then be associated with the full capacity of the memory sub-system and stored as part of the configuration data of the memory sub-system.

WAF is usually computed after an entire capacity of a memory sub-system is filled or reached by written data multiple times. Also, the amount of data that needs to be written for the memory sub-system to fill the reduced capacity of the memory sub-system can be substantially (e.g., by orders of magnitude or factors) smaller than that needed to be written to fill the full capacity of the memory sub-system. In this way, the amount of time it takes to compute the WAF for the memory sub-system can be substantially reduced when performed relative to the reduced capacity memory sub-system which improves the overall efficiencies of computing WAF and avoids wasting time and resources.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations (also referred to as backend operations), such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

NAND-based SSD can only withstand a limited number of write-erase operations in their own life as each one of such operations wears the cell out and makes it less reliable at each pass. Several techniques are in place to limit its impact (like wear-leveling data movements), but finding the appropriate number of write-erase cycles any SSD can withstand is fundamental to characterize it and has legal and commercial implications as well, such as device warranty. The issue is made much worse by the fact that the write-erase cycles are measured at NAND itself, not at the SSD interface, and thus include a lot of internal back-end operations, like garbage collection (e.g., media management operations), that the SSD needs to perform to operate and that are not visible outside the SSD. The number of such operations can be very large and can be estimated as about 4× to 5× larger than similar operations (writes) at the SSD interface. These additional operations need to be accounted for accurately. The main aspect to measure these operations is called WAF which can be computed as a ratio between NAND writes and SSD writes. This accounts for all internal back-end operations (e.g., media management operations) like Garbage Collection, Wear Level etc.

One challenge with accurately computing the WAF for an SSD is that the time to perform such measurements grows as SSD size grows. To have reliable WAF data, the SSD needs to be preconditioned by being fully written several times over (4-5 times is the most common) to create appropriate aging of the data set and making the backend operation reliable at what is called "steady state." Fully writing the SSD several times over also grows in time with SSD capacity growth. As such, the time to precondition the SSD to compute the WAF is growing from a few hours to many hours to several days, making current approaches less and less viable. For these reasons, conventional approaches to measuring WAF are impracticable and cannot be carried out efficiently for very large memory sub-systems.

Examples of the present disclosure address the above and other deficiencies by providing a memory controller (e.g., a RAID controller and/or host) that can measure WAF for a small, specified portion of the memory sub-system (e.g., representing a reduced capacity of the memory sub-system). Measuring the WAF for the small portion of the memory sub-system (e.g., less than the full capacity of the memory sub-system) can be performed quickly and efficiently which reduces the amount of time and resources needed to compute the WAF for the full capacity memory sub-system. This measured WAF can be reported and associated with the full capacity memory sub-system as the same set of factors (e.g., amount of overprovisioning, number of channels, number of memory dies, and so forth) are leveraged to create the reduced capacity memory sub-system.

Specifically, the disclosed techniques perform WAF calculation on a small, fixed-size capacity (say, 1 TB as an example) that would converge in a given time (the same as 1 TB SSD), and its value would be usable for the entire SSD capacity (as it is independent of capacity itself). The disclosed techniques place the memory sub-system in the WAF mode where a small, fixed-size capacity is exposes to the host, back-end NAND blocks are allocated to match the reported fixed-size capacity (1 TB) plus a selected overprovisioning portion (7% in most cases), (e.g., 1.07 TB), and memory blocks are uniformly distributed along the NAND die on every NAND channel. This increases parallelism and reduces test time. The memory controller only sees a 1 TB SSD and can run whatever benchmark it is configured for computing WAF and would precondition the SSD in a similar method.

In some examples, the memory controller receives a request to place the memory sub-system into a WAF mode. The memory controller, in response to receiving the request, reduces a full capacity of the memory sub-system to a reduced capacity by restricting write operations to an individual portion of the memory sub-system including an individual portion of the set of memory components. The memory controller generates a log that tracks a number of write operations (e.g., backend operations) performed to store data to the individual portion of the set of memory components relative to a plurality of requests (at an SSD or memory sub-system interface) to program the data to the individual portion of the memory sub-system. The memory controller computes, based on the log, the WAF for the full capacity of the memory sub-system based on the WAF of the reduced capacity of the memory sub-system.

The full capacity of the memory sub-system can include 128 terabytes (TB) or more and the reduced capacity includes 1 TB or less. In some cases, the memory controller receives a first set of the plurality of requests to program data, the first set of the plurality of requests including an amount of data corresponding to a size of the reduced capacity. The memory controller determines that the reduced capacity of the memory sub-system has been completely filled when an entirety of the individual portion of the set of memory components has been programmed by the first set of the plurality of requests to program data. After the reduced capacity of the memory sub-system has been completely filled, the memory controller receives a second set of the plurality of requests (e.g., at an SSD interface) to program additional data. In response to receiving the second set of the plurality of requests to program the additional data, the memory controller replaces at least some of the data stored in the individual portion of the set of memory components with the additional data.

The memory controller performs one or more additional write operations for each request in the second set of the plurality of requests to replace at least some of the data stored in the individual portion of the set of memory components with the additional data. In some cases, the memory controller increments a first counter stored in the log each time a request to program an individual block of data is received from a host and increments a second counter stored in the log each time a write operation is performed on the set of memory components to program the individual block of data received from the host.

The memory controller computes the WAF for the reduced capacity of the memory sub-system as a ratio between a first number of requests to write data to the memory sub-system and a second number of write operations performed on the individual portion of the set of memory components. The write operations performed on the individual portion of the set of memory components can include back-end operations, the back-end operations including garbage collection operations and wear leveling operations. The WAF can be computed in response to determining that an amount of data requested to be programmed to the individual portion of the memory sub-system exceeds the reduced capacity by a specified factor. In some cases, the specified factor is greater than four. In some aspects, the specified factor is provided in the request to place the memory sub-system into the WAF mode.

In some examples, the memory controller prevents garbage collection operations from being performed using portions of the set of memory that exclude the individual portion of the set of memory components. The memory controller allows garbage collection operations to be performed using only the individual portion of the set of memory components associated with the individual portion of the memory sub-system. The individual portion of the set of memory components can include a specified physical portion of each memory die of a plurality of memory dies of the memory sub-system. In some cases, the memory controller uniformly distributes a set of memory blocks including the individual portion of the memory sub-system across all memory dies of the memory sub-system and all channels of the memory sub-system.

The memory controller determines an overprovisioned value associated with the full capacity of the memory sub-system and selects the individual portion of the set of memory components based on the size of the reduced capacity and the overprovisioned value to generate the reduced capacity of the memory sub-system having a same overprovisioned value as the full capacity. In some cases, the memory controller determines an amount of physical storage available across an entirety of the set of memory components of the memory sub-system and determines a size of the full capacity of the memory sub-system reported to a host. The memory controller computes the overprovisioned value as a ratio of the amount of physical storage and the size of the full capacity. The memory controller multiplies the reduced capacity by the overprovisioned value to determine the amount of physical storage needed to implement the reduced capacity of the memory sub-system and allocates the individual portion of the set of memory components to the reduced capacity of the memory sub-system in response to multiplying the reduced capacity by the overprovisioned.

In some cases, the request to place the memory sub-system into the WAF mode includes a size for the reduced capacity and the full capacity is reduced to the size of the reduced capacity specified in the request.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed. In some cases, the first memory component 112A can be implemented by a first SSD (or a first independently operable memory sub-system) and the second memory component 112N can be implemented by a second SSD (or a second independently operable memory sub-system).

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N (which are used to implement the storage capabilities of the memory sub-system 110) can include any combination of the different types of non-volatile memory components and/or volatile memory components and/or storage devices. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations (also referred to as back-end operations), such as different scan rates, different scan frequencies, different wear leveling, different read disturb management, garbage collection operations, different near miss ECC operations, and/or different dynamic data refresh.

The memory sub-system controller 115 can include hardware, such as one or more integrated circuits and/or discrete components, a buffer memory, or a combination thereof. The memory sub-system controller 115 can be a microcontroller, special-purpose logic circuitry (e.g., a field programmable gate array (FPGA), an application-specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some examples, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the lifetime (maximum) PEC values and/or reliability grades associated with different groups of the memory components 112N to 112N and/or different blocks within each of the memory components 112N to 112N of each memory component used to implement the memory sub-system. For example, the memory sub-system may be made up of three memory components (e.g., three SSDs).

In some cases, the configuration data can specify the reported capacity of the memory sub-system 110. Specifically, the amount of storage available physically on the memory components 112N to 112N can exceed the amount of storage reported as being available to the host system 120. The ratio of the amount of storage physically available and possible relative to the amount of storage that is reported as being available to the host system 120 is referred to as the overprovisioned capacity of the memory sub-system 110. Usually, the amount of storage physically available on the memory components 112N to 112N exceeds the amount of storage that is reported by 20-30%. The extra storage space is usually reserved for performing various memory management operations to maintain integrity of the data that is stored by the host system 120. Data requests to program data to the memory sub-system 110 are received from the host system 120. Such requests are processed by the memory sub-system controller 115 to generate one or more write commands to physically store the requested data to the memory components 112N to 112N. Sometimes, the number of write commands that are generated in response to a single request to program an individual block or portion of data to the memory sub-system 110 is referred to as WAF. Measuring this WAF is non-trivial can consume a great deal of time and resources if performed across the maximum capacity of the memory sub-system 110.

In some examples, in order to measure the WAF of any given memory sub-system 110, the host system 120 can provide a request to place the memory sub-system 110 into the WAF mode. The memory sub-system controller 115 can include a media operations manager 122 (shown in more detail as media operations manager 200 in FIG. 2). The media operations manager 122 can receive this request to place the memory sub-system 110 into the WAF mode. In some cases, the request to place the memory sub-system 110 into the WAF can specify various parameters including an overprovisioned capacity value, a reduced capacity size value, the number of times data is to be overwritten before WAF is measured, and so forth.

In response to receiving the request to place the memory sub-system 110 into the WAF mode, the media operations manager 122 reduces a full (maximum) capacity of the memory sub-system 110 to a reduced capacity by restricting write operations to an individual portion of the memory sub-system 110 that includes an individual portion of a set of memory components 112A to 112N. The media operations manager 122 generates a log that tracks a number of write operations performed to store data to the individual portion of the set of memory components relative to a plurality of requests to program the data to the individual portion of the memory sub-system. The media operations manager 122 then computes, based on the log, the WAF for the full capacity of the memory sub-system 110 based on the WAF of the reduced capacity of the memory sub-system 110. After computing the WAF of the reduced capacity of the memory sub-system 110, the media operations manager 122 automatically returns the memory sub-system 110 into the normal operations mode where the full capacity (full reported capacity) is made available for programming by the host system 120.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some examples, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

Depending on the example, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein.

Figure 2:
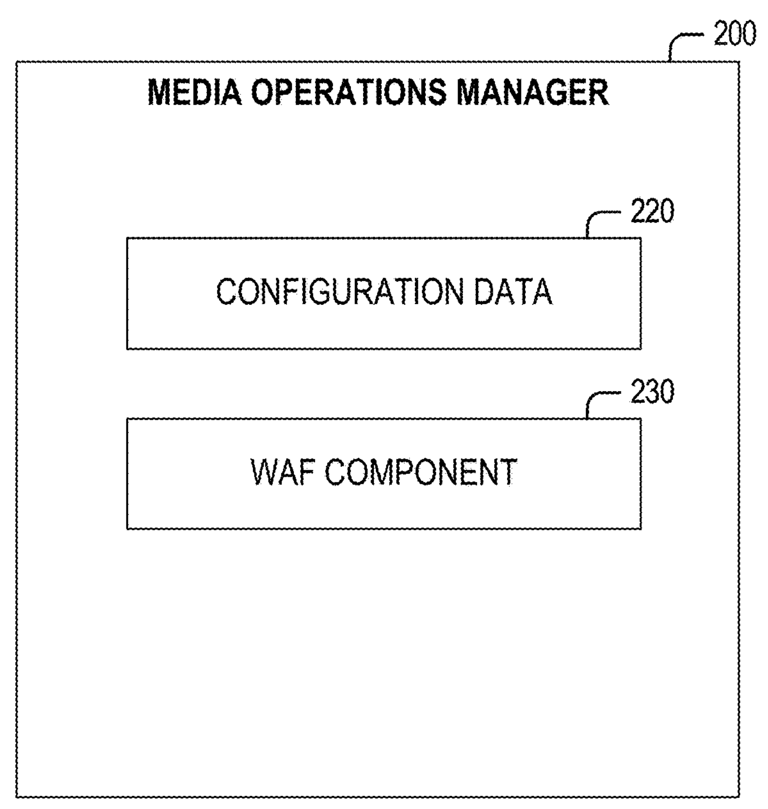
FIG. 2 is a block diagram of an example media operations manager, in accordance with some implementations of the present disclosure.

FIG. 2 is a block diagram of an example media operations manager 200 (corresponding to media operations manager 122), in accordance with some implementations of the present disclosure. As illustrated, the media operations manager 200 includes configuration data 220 and a WAF component 230. For some examples, the media operations manager 200 can differ in components or arrangement (e.g., less or more components) from what is illustrated in FIG. 2.

The configuration data 220 accesses and/or stores configuration data associated with the memory components 112A to 112N. In some examples, the configuration data 220 is programmed into the media operations manager 200. For example, the media operations manager 200 can communicate with the memory components 112A to 112N to obtain the configuration data and store the configuration data 220 locally on the media operations manager 122. In some examples, the media operations manager 122 communicates with the host system 120. The host system 120 receives input from an operator or user that specifies parameters including virtual memory group assignments to physical memory components, lifetime (maximum) PEC values of different bins, groups, blocks, block stripes, memory dies, and/or sets of the memory components 112A to 112N, and/or the overprovisioned value of the memory sub-system 110 (e.g., the reported full capacity of the memory sub-system 110). The media operations manager 122 can receive configuration data from the host system 120 and stores the configuration data in the configuration data 220. In some cases, the media operations manager 122 accesses region size information from each of the memory components 112A to 112N used to store data in the memory sub-system 110 and can communicate that information to the host system 120.

Figure 5:
FIG. 5 is a block diagram of an example write amplification (WAF) log for a memory sub-system, in accordance with some implementations of the present disclosure.
Figure 5:
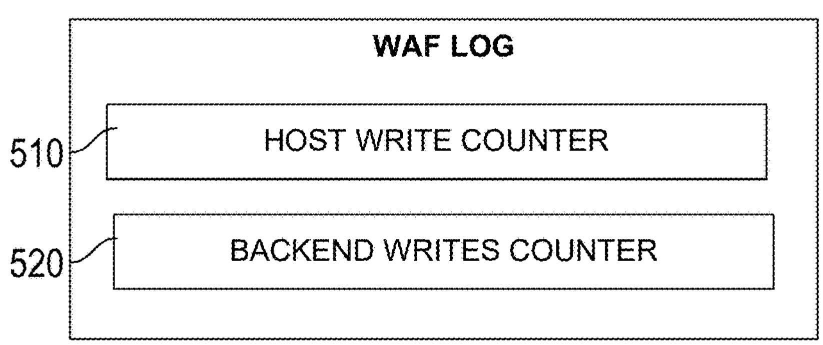

The configuration data 220 can store a WAF log, such as the WAF log 500 shown in FIG. 5. The WAF log 500 can be used to track the number of requests to program a block or other specified portion of data received from the host system 120 and the number of writes that are generated by the memory sub-system controller 115 (e.g., backend operations). In some cases, the WAF component 230 can receive a request from the host system 120 to place the memory sub-system 110 into the WAF mode. Among other operations, the WAF component 230 clears all of the counters stored in the WAF log 500 and begins updating/incrementing the counters in response to various write operations.

In some examples, in response to receiving the request from the host system 120 to place the memory sub-system 110 into the WAF mode, the WAF component 230 can reduce a reported capacity of the memory sub-system 110 by restricting write operations and memory management operations to only be performed on a smaller specified region of the set of memory components 112A to 112N. To do so, the WAF component 230 can obtain or compute the overprovisioned value of the memory sub-system 110, such as by accessing this information from the configuration data 220. In order to compute the overprovisioned value of the full capacity of the memory sub-system 110, the configuration data 220 can determine an amount of physical storage available across the entirety of the set of memory components 112A to 112N of the memory sub-system 110. The configuration data 220 can then determine a size of the full capacity of the memory sub-system memory sub-system 110 reported to the host system 120 and can compute the overprovisioned value as a ratio of the amount of physical storage and the size of the full capacity.

Figure 3:
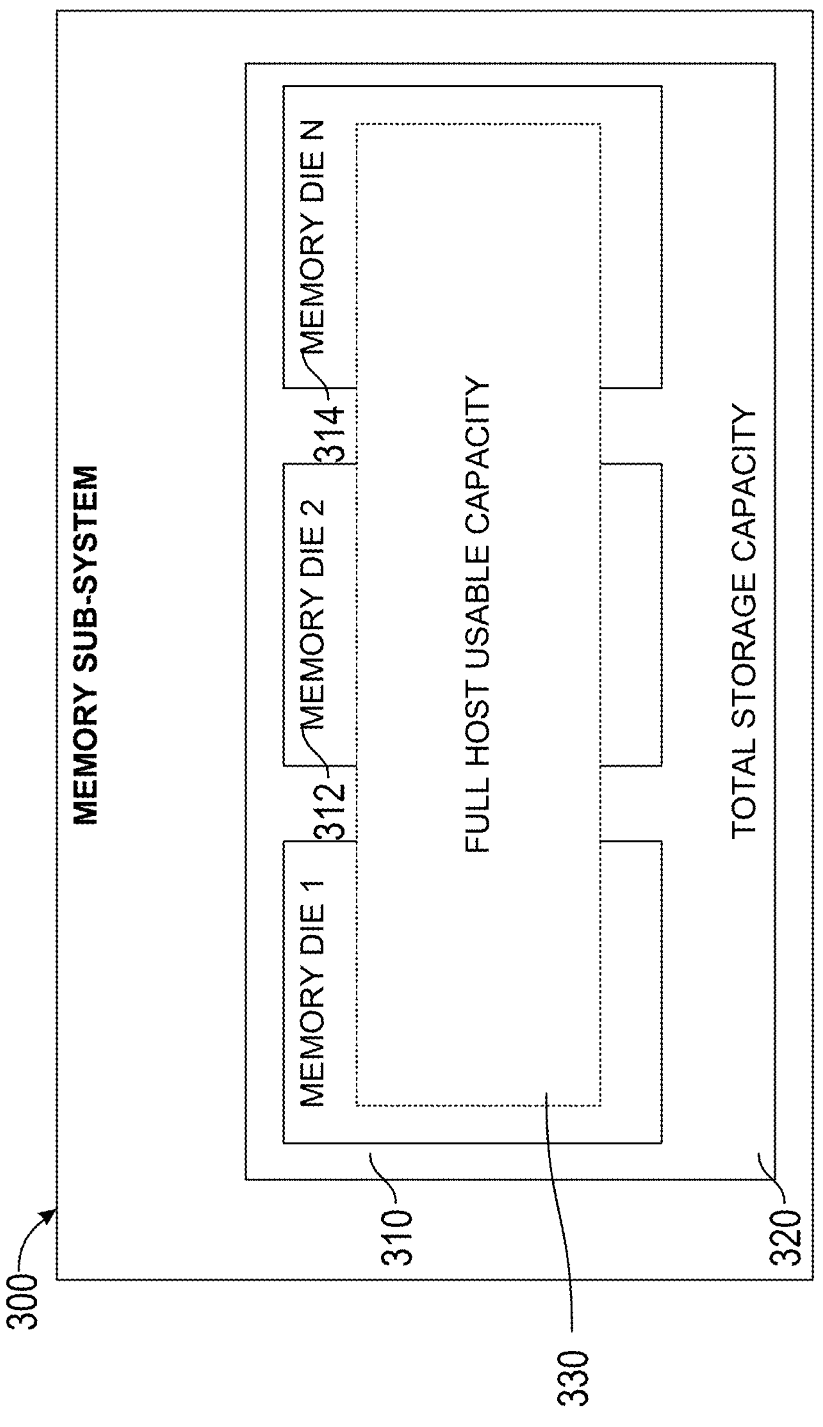
FIG. 3 is a block diagram of an example full capacity allocation of the memory sub-system, in accordance with some implementations of the present disclosure.

For example, as shown in FIG. 3, the memory sub-system 300 (which corresponds to the memory sub-system 110) can be implemented by multiple memory components (e.g., memory dies 310, 312, and 314). The total physical storage capacity 320 available for storing data using the memory dies 310, 312, and 314 can be greater than the full host usable capacity 330 that is reported to the host system 120. For example, the usable capacity 330 can correspond to 128 TB and the total physical storage capacity 320 can correspond to 154 TB. In such cases, the full capacity of the usable capacity 330 can be the usable capacity 330 (e.g., 128 TB) and the overprovisioned value is 20% (which is computed as the ratio of the total physical storage capacity 320 to the usable capacity 330).

The configuration data 220 can select the individual portion of the set of memory components 112A to 112N based on a size of the reduced capacity and the overprovisioned value to generate the reduced capacity of the memory sub-system having a same overprovisioned value as the full capacity. In some cases, the request to place the memory sub-system 110 into the WAF mode can specify a reduced capacity value. In some cases, the reduced capacity value can be stored in the configuration data 220. For example, the full capacity of the memory sub-system 110 that is reported to the host system 120 can be a first value, such as 128 TB and the reduced capacity value can be a fraction of that full capacity, such as 1 TB. As part of reducing the capacity of the memory sub-system 110 to the reduced capacity, it is important to maintain the same overprovisioned value (e.g., the ratio of reported to physically available capacity) in order to accurately track and determine the WAF of the full capacity of the memory sub-system 110.

As such, the WAF component 230 can multiply the reduced capacity (e.g., 1 TB) by the overprovisioned value (e.g., 20%) to determine an amount of physical storage needed to implement the reduced capacity of the memory sub-system 110. In response, the WAF component 230 allocates the individual portion of the set of memory components 112A to 112N to the reduced capacity of the memory sub-system 110. Namely, the WAF component 230 can allocate a portion of the set of memory components 112A to 112N having a size corresponding to the reduced capacity (e.g., 1 TB) multiplied by the overprovisioned value (e.g., 20%) which can correspond to a total value of 1.20 TB. In some cases, the allocated portion of the set of memory components 112A to 112N corresponds to a specified physical portion of each memory die of a plurality of memory dies of the memory sub-system 110. In some cases, the allocated portion of the set of memory components 112A to 112N is uniformly distributed across each of the set of memory components 112A to 112N across all memory dies of the memory sub-system 110 and all channels of the memory sub-system 110.

The WAF component 230 can then restrict all write operations to only this allocated portion of the set of memory components 112A to 112N. In this way, the WAF component 230 prevents garbage collection operations (or other memory management operations) from being performed using portions of the set of memory that exclude the allocated portion of the set of memory components 112A to 112N and allows garbage collection operations (or other memory management operations) to be performed using only the allocated portion of the set of memory components 112A to 112N.

Figure 4:
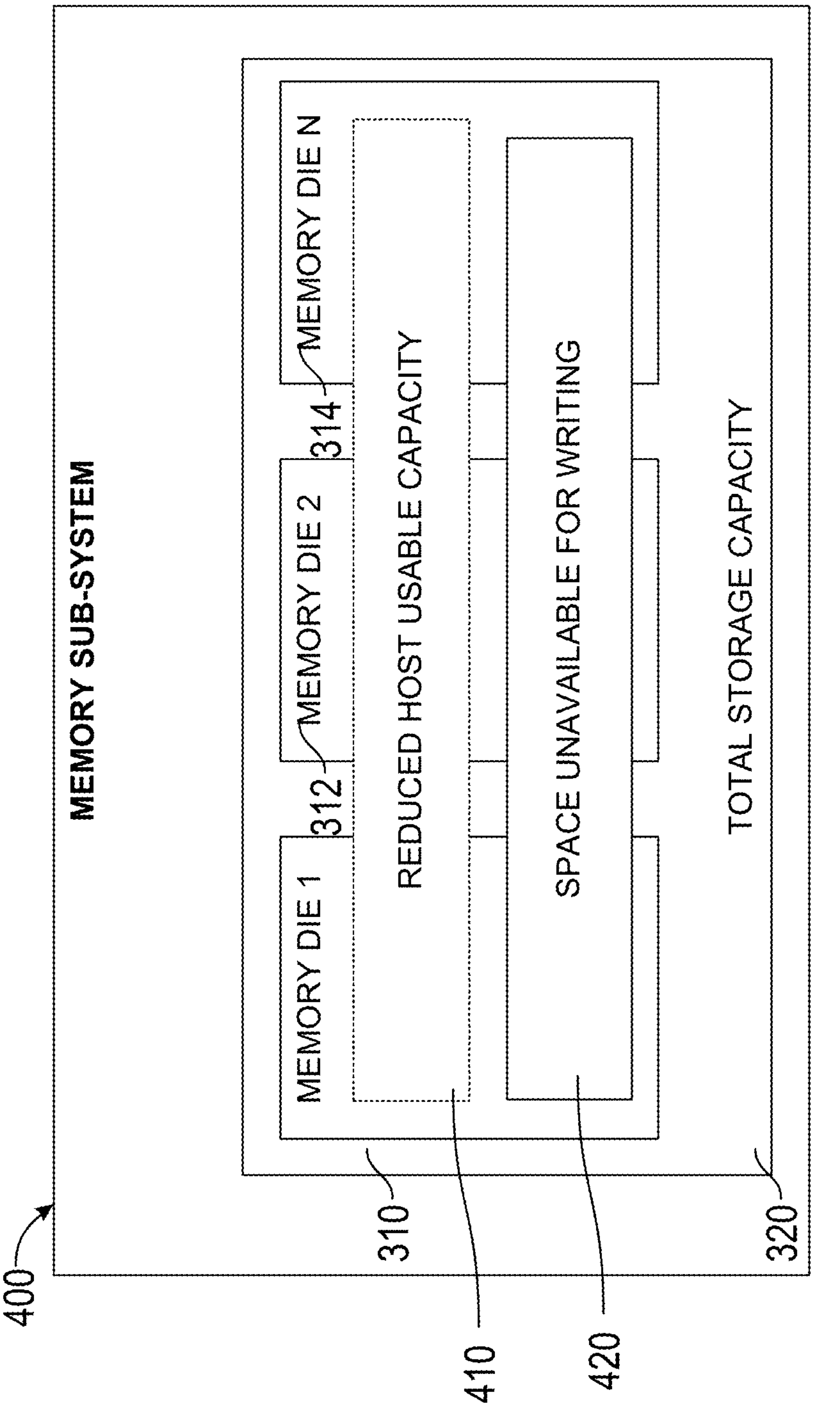
FIG. 4 is a block diagram of an example reduced capacity allocation of the memory sub-system, in accordance with some implementations of the present disclosure.

For example, as shown in FIG. 4, the reduced capacity memory subsystem 400 (corresponding to the memory subsystem 300 after being placed in the WAF mode), includes the same multiple memory components (e.g., memory dies 310, 312, and 314). In the configuration of the reduced capacity memory subsystem 400, the total physical storage capacity 320 remains unchanged but the physical space that is reported to the host system 120 and made available for storing data is represented by the reduced host usable capacity 410. The amount of space available in the reduced host usable capacity 410 can correspond to 1 TB and is smaller than the usable capacity 330. The amount of space available in the reduced host usable capacity 410 can be smaller than the usable capacity 330 by a certain fraction and can be specified in the request to place the memory subsystem 110 in the WAF mode. Other portions of the multiple memory components can be reserved for performing memory management operations and the size of these portions can be computed using the overprovisioned value determined by computing the total physical storage capacity 320 to the usable capacity 330. Namely, the reduced capacity memory subsystem 400 can allocate 1.2 TB of physical storage of the set of memory components 112A to 112N which is a small fraction of the 154 TB total available physical storage in the memory sub-system 110. The WAF component 230 can prevent data from being written and/or can prevent memory management operations from being performed on certain other portions (e.g., space unavailable for writing portion 420) of the memory dies 310, 312, and 314. This enables the WAF component 230 to simulate the WAF behavior of the full capacity memory sub-system 110 by tracking memory requests from the host system 120 and writes performed by the WAF component 230 using the reduced capacity memory subsystem 400.

In some examples, the WAF component 230, after placing the memory sub-system 110 into the WAF mode, can receive multiple requests to program data to the memory sub-system 110 from the host system 120. The WAF component 230 can generate write requests and memory management operations to store the data to the reduced capacity memory sub-system 110 (e.g., only storing data in the restricted portions of the set of memory components 112A to 112N). As each request to program an individual block of data is received from the host system 120, the WAF component 230 increments a host write counter 510. Each time a request to write data is generated by the WAF component 230 to communicate with and physically store data to the restricted portions of the set of memory components 112A to 112N, a backend writes counter 520 is incremented. This allows the WAF component 230 to track the number of requests to program data received from the host system 120 relative to the amount of writes that are generated by the WAF component 230 to physically store the data.

In some cases, as part of storing the data, various garbage collection operations need to be performed which require writing one or more blocks of data from one region of the restricted portions of the set of memory components 112A to 112N to another. These garbage collection operations trigger the WAF component 230 to increment the backend writes counter 520 and can exceed the number of requests to program data by a certain factor. Specifically, after the entire restricted portions of the set of memory components 112A to 112N is programmed with data, the WAF component 230 can receive requests to program the same LBAs from the host system 120 again. This requires overwriting previously written data which involves multiple garbage collection operations to be performed. The WAF component 230 can track the number of times that the same LBA has been overwritten to determine how many times the reduced capacity of the memory sub-system 110 has been reached. The WAF component 230 can access the configuration data 220 to determine the factor used to control WAF computation. This factor can specify how many times the reduced capacity of the memory sub-system 110 needs to be overwritten before WAF is computed.

In some examples, the WAF component 230 determines whether an amount of data requested to be programmed by the host system 120 to the restricted portion of the memory sub-system 110 exceeds the reduced capacity by the specified factor (e.g., four). Namely, the WAF component 230 determine whether 4 TB of data has been received in requests from the host system 120 which exceeds the reduced capacity of 1 TB of the memory sub-system 110 by a factor of four. In such cases, the WAF component 230 terminates the WAF mode and computes the WAF of the reduced capacity of the memory sub-system 110 based on the data stored in the WAF log 500. For example, the WAF component 230 computes the WAF for the reduced capacity of the memory sub-system 110 as a ratio of a first number of requests to write data to the memory sub-system 110 (received from the host system 120) and a second number of write operations performed on the individual portion of the set of memory components (e.g., backend write operations). In some cases, the WAF component 230 computes the WAF as a ratio of the host write counter 520 to the backend writes counter 510. The WAF component 230 can then report this WAF to the host system 120 and/or store this WAF in association with the full capacity of the memory sub-system 110 in the configuration data 220.

Figure 6:
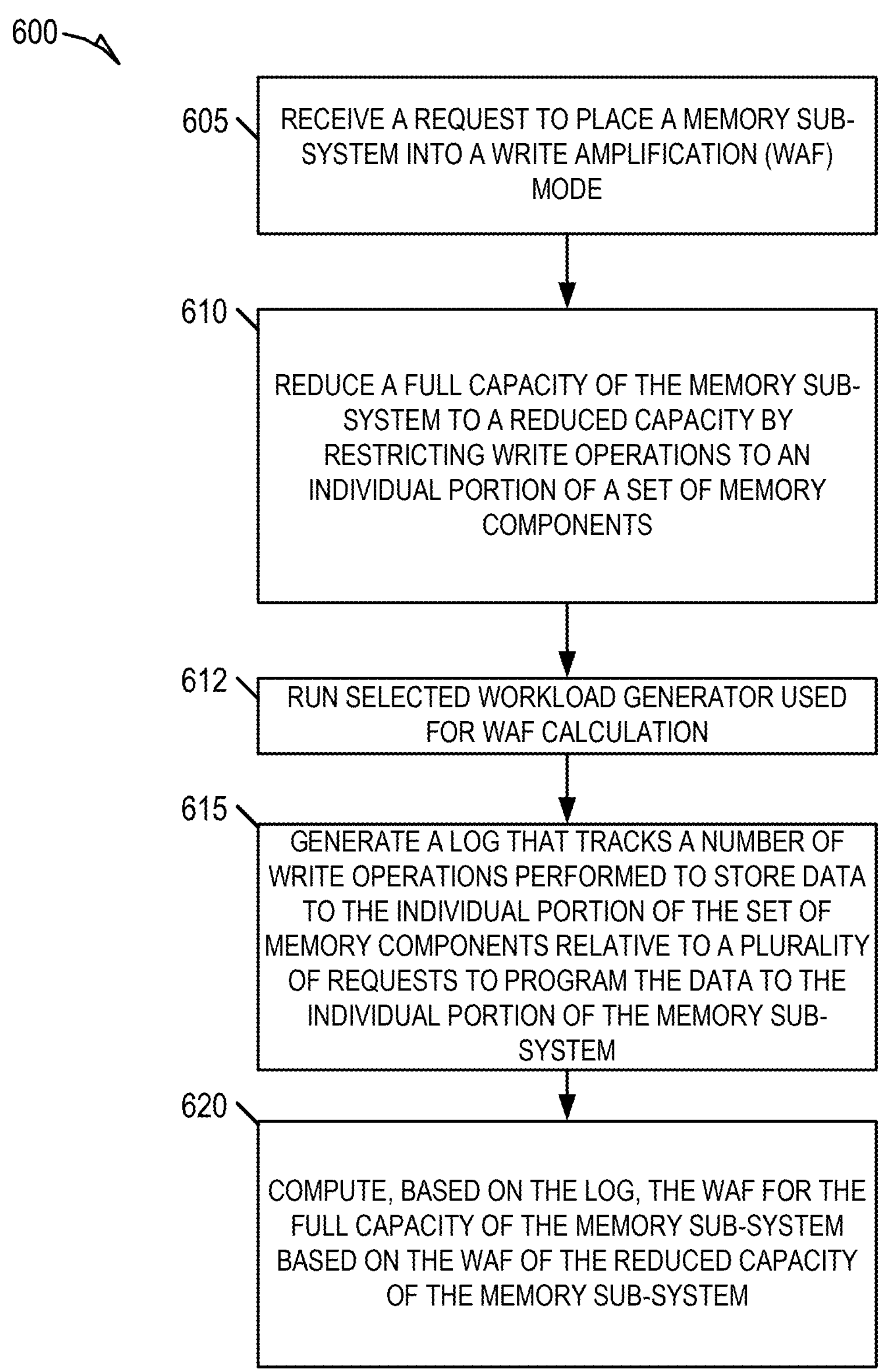
FIG. 6 is a flow diagram of an example method to compute WAF of a memory sub-system, in accordance with some implementations of the present disclosure.

FIG. 6 is a flow diagram of an example method 600, in accordance with some implementations of the present disclosure. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 600 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 6, the method (or process) 600 begins at operation 605, with a media operations manager 122 of a memory sub-system (e.g., memory sub-system 110) receiving a request to place a memory sub-system into a WAF mode. Then, at operation 610, the media operations manager 122, in response to receiving the request, reduces a full capacity of the memory sub-system to a reduced capacity by restricting write operations to an individual portion of the memory sub-system comprising an individual portion of a set of memory components. The media operations manager 122 runs a selected workload generator used for WAF calculation at operation 612. Then, at operation 615, the media operations manager 122 generates a log that tracks a number of write operations performed to store data to the individual portion of the set of memory components relative to a plurality of requests to program the data to the individual portion of the memory sub-system and, at operation 620, computes, based on the log, the WAF for the full capacity of the memory sub-system based on the WAF of the reduced capacity of the memory sub-system.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device configured to perform operations comprising: receiving a request to place the memory sub-system into a write amplification (WAF) mode; in response to receiving the request, reducing a full capacity of the memory sub-system to a reduced capacity by restricting write operations to an individual portion of the memory sub-system (e.g., an individual portion of the set of memory components); generating a log that tracks a number of write operations performed to store data to the individual portion of the set of memory components relative to a plurality of requests to program the data to the individual portion of the memory sub-system; and computing, based on the log, the WAF for the full capacity of the memory sub-system based on the WAF of the reduced capacity of the memory sub-system.

Example 2. The system of Example 1, wherein the full capacity of the memory sub-system comprises 128 terabytes (TB) or more and the reduced capacity comprises 1 TB or less.

Example 3. The system of any one of Examples 1-2, the operations comprising: receiving a first set of the plurality of requests to program data, the first set of the plurality of requests comprising an amount of data corresponding to a size of the reduced capacity; and determining that the reduced capacity of the memory sub-system has been completely filled when an entirety of the individual portion of the set of memory components has been programmed by the first set of the plurality of requests to program data.

Example 4. The system of Example 3, the operations comprising: after the reduced capacity of the memory sub-system has been completely filled, receiving a second set of the plurality of requests to program additional data; and in response to receiving the second set of the plurality of requests to program the additional data, replacing at least some of the data stored in the individual portion of the set of memory components with the additional data.

Example 5. The system of Example 4, the operations comprising: performing one or more additional write operations for each request in the second set of the plurality of requests to replace at least some of the data stored in the individual portion of the set of memory components with the additional data.

Example 6. The system of any one of Examples 4-5, the operations comprising: incrementing a first counter stored in the log each time a request to program an individual block of data is received from a host; and incrementing a second counter stored in the log each time a write operation is performed on the set of memory components to program the individual block of data received from the host.

Example 7. The system of any one of Examples 1-6, the operations comprising: computing the WAF for the reduced capacity of the memory sub-system as a ratio between a first number of requests to write data to the memory sub-system and a second number of write operations performed on the individual portion of the set of memory components.

Example 8. The system of Example 7, wherein the write operations performed on the individual portion of the set of memory components comprise back-end operations, the back-end operations comprising garbage collection operations and wear leveling operations.

Example 9. The system of any one of Examples 1-8, wherein the WAF is computed in response to determining that an amount of data requested to be programmed to the individual portion of the memory sub-system exceeds the reduced capacity by a specified factor.

Example 10. The system of Example 9, wherein the specified factor is greater than four.

Example 11. The system of any one of Examples 9-10, wherein the specified factor is provided in the request to place the memory sub-system into the WAF mode.

Example 12. The system of any one of Examples 1-11, the operations comprising: preventing garbage collection operations from being performed using portions of the set of memory that exclude the individual portion of the set of memory components.

Example 13. The system of any one of Examples 1-12, the operations comprising: allowing garbage collection operations to be performed using only the individual portion of the set of memory components associated with the individual portion of the memory sub-system.

Example 14. The system of any one of Examples 1-13, wherein the individual portion of the set of memory components comprises a specified physical portion of each memory die of a plurality of memory dies of the memory sub-system.

Example 15. The system of Example 14, the operations comprising: uniformly distributing a set of memory blocks comprising the individual portion of the memory sub-system across all memory dies of the memory sub-system and all channels of the memory sub-system.

Example 16. The system of any one of Examples 1-15, the operations comprising: determining an overprovisioned value associated with the full capacity of the memory sub-system; and selecting the individual portion of the set of memory components based on a size of the reduced capacity and the overprovisioned value to generate the reduced capacity of the memory sub-system having a same overprovisioned value as the full capacity.

Example 17. The system of Example 16, the operations comprising: determining an amount of physical storage available across an entirety of the set of memory components of the memory sub-system; determining a size of the full capacity of the memory sub-system reported to a host; computing the overprovisioned value as a ratio of the amount of physical storage and the size of the full capacity; multiplying the reduced capacity by the overprovisioned value to determine an amount of physical storage needed to implement the reduced capacity of the memory sub-system; and allocating the individual portion of the set of memory components to the reduced capacity of the memory sub-system in response to multiplying the reduced capacity by the overprovisioned.

Example 18. The system of any one of Examples 1-17, wherein the request to place the memory sub-system into the WAF mode comprises a size for the reduced capacity, and wherein the full capacity is reduced to the size of the reduced capacity specified in the request.

Methods and computer-readable storage medium with instructions for performing any one of the above Examples.

Figure 7:
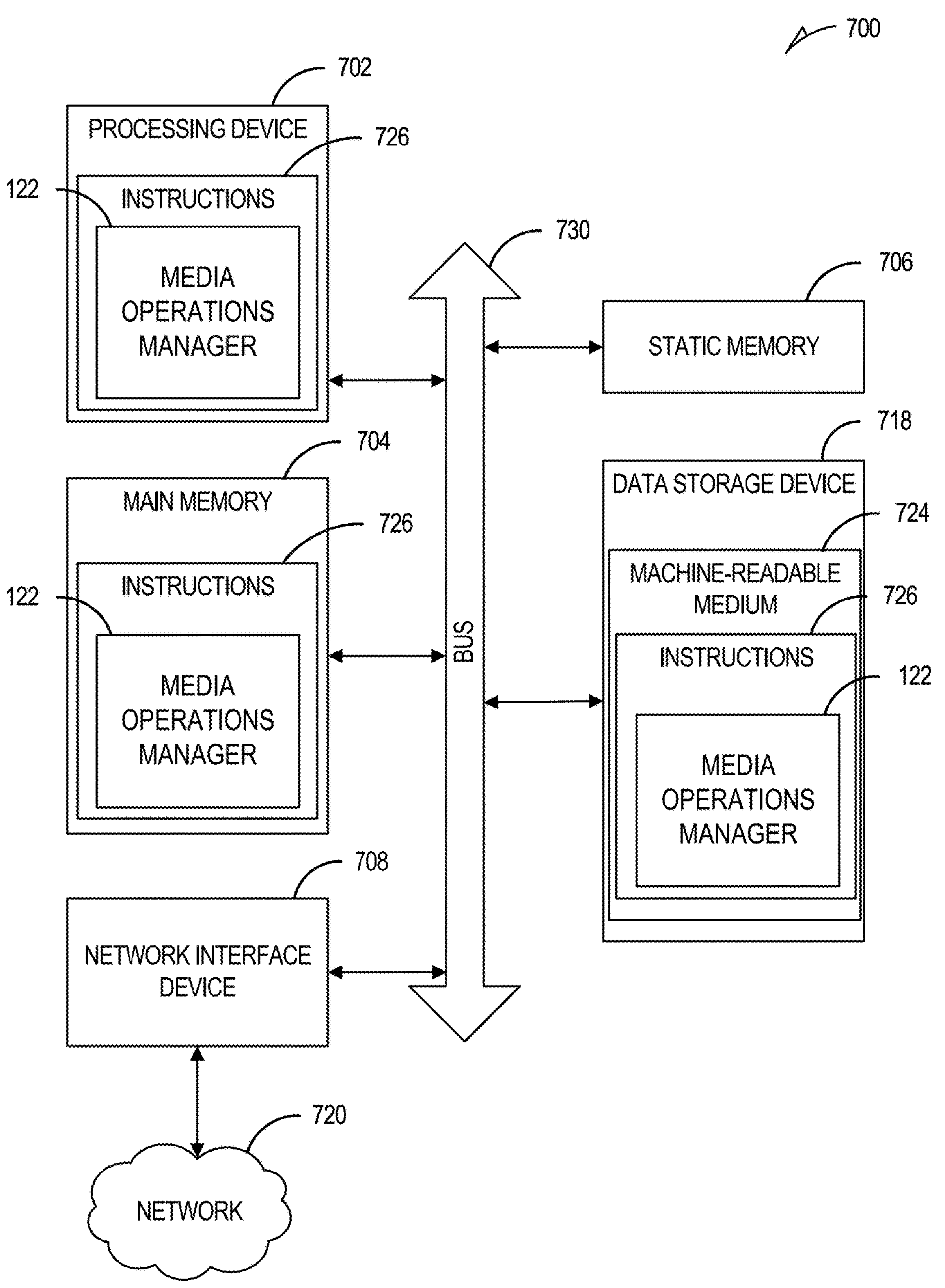
FIG. 7 is a block diagram illustrating a diagrammatic representation of a machine in the form of a computer system within which a set of instructions can be executed for causing the machine to perform any one or more of the methodologies discussed herein, in accordance with some examples of the present disclosure.

FIG. 7 illustrates an example machine in the form of a computer system 700 within which a set of instructions can be executed for causing the machine to perform any one or more of the methodologies discussed herein. In some examples, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative examples, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one example, the instructions 726 implement functionality corresponding to the media operations manager 122 of FIG. 1. While the machine-readable storage medium 724 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, the disclosure has been described with reference to specific examples thereof. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:

a set of memory components of a memory sub-system; and at least one processing device operatively coupled to the set of memory components, the at least one processing device configured to perform operations comprising:

receiving a request to place the memory sub-system into a write amplification mode;

in response to receiving the request, reducing a full capacity of the memory sub-system to a reduced capacity by restricting write operations to an individual portion of the set of memory components;

generating a log that tracks a number of write operations performed to store data to the individual portion of the set of memory components relative to a plurality of requests to program the data to the individual portion of the memory sub-system; and computing, based on the log, a write amplification for the full capacity of the memory sub-system based on a write amplification of the reduced capacity of the memory sub-system.

2. The system of claim 1, wherein the full capacity of the memory sub-system comprises 128 terabytes (TB) or more and the reduced capacity comprises 1TB or less.

3. The system of claim 1, the operations comprising:

receiving a first set of the plurality of requests to program data, the first set of the plurality of requests comprising an amount of data corresponding to a size of the reduced capacity; and determining that the reduced capacity of the memory sub-system has been completely filled when an entirety of the individual portion of the set of memory components has been programmed by the first set of the plurality of requests to program data.

4. The system of claim 3, the operations comprising:

after the reduced capacity of the memory sub-system has been completely filled, receiving a second set of the plurality of requests to program additional data; and in response to receiving the second set of the plurality of requests to program the additional data, replacing at least some of the data stored in the individual portion of the set of memory components with the additional data.

5. The system of claim 4, the operations comprising: performing one or more additional write operations for each request in the second set of the plurality of requests to replace at least some of the data stored in the individual portion of the set of memory components with the additional data.

6. The system of claim 4, the operations comprising: incrementing a first counter stored in the log each time a request to program an individual block of data is received from a host; and incrementing a second counter stored in the log each time a write operation is performed on the set of memory components to program the individual block of data received from the host.

7. The system of claim 1, the operations comprising: computing the write amplification for the reduced capacity of the memory sub-system as a ratio between a first number of requests to write data to the memory sub-system and a second number of write operations performed on the individual portion of the set of memory components.

8. The system of claim 7, wherein the write operations performed on the individual portion of the set of memory components comprise back-end operations, the back-end operations comprising garbage collection operations and wear leveling operations.

9. The system of claim 1, wherein the write amplification is computed in response to determining that an amount of data requested to be programmed to the individual portion of the memory sub-system exceeds the reduced capacity by a specified factor.

10. The system of claim 9, wherein the specified factor is greater than four.

11. The system of claim 9, wherein the specified factor is provided in the request to place the memory sub-system into the write amplification mode.

12. The system of claim 1, the operations comprising: preventing garbage collection operations from being performed using portions of the set of memory that exclude the individual portion of the set of memory components.

13. The system of claim 1, the operations comprising: allowing garbage collection operations to be performed using only the individual portion of the set of memory components associated with the individual portion of the memory sub-system.

14. The system of claim 1, wherein the individual portion of the set of memory components comprises a specified physical portion of each memory die of a plurality of memory dies of the memory sub-system.

15. The system of claim 14, the operations comprising: uniformly distributing a set of memory blocks comprising the individual portion of the memory sub-system across all memory dies of the memory sub-system and all channels of the memory sub-system.

16. The system of claim 1, the operations comprising: determining an overprovisioned value associated with the full capacity of the memory sub-system; and selecting the individual portion of the set of memory components based on a size of the reduced capacity and the overprovisioned value to generate the reduced capacity of the memory sub-system having a same overprovisioned value as the full capacity.

17. The system of claim 16, the operations comprising: determining an amount of physical storage available across an entirety of the set of memory components of the memory sub-system; determining a size of the full capacity of the memory sub-system reported to a host; computing the overprovisioned value as a ratio of the amount of physical storage and the size of the full capacity; multiplying the reduced capacity by the overprovisioned value to determine an amount of physical storage needed to implement the reduced capacity of the memory sub-system; and allocating the individual portion of the set of memory components to the reduced capacity of the memory sub-system in response to multiplying the reduced capacity by the overprovisioned.

18. The system of claim 1, wherein the request to place the memory sub-system into the write amplification mode comprises a size for the reduced capacity, and wherein the full capacity is reduced to the size of the reduced capacity specified in the request.

19. A method comprising: receiving a request to place a memory sub-system into a write amplification mode; in response to receiving the request, reducing a full capacity of the memory sub-system to a reduced capacity by restricting write operations to an individual portion of a set of memory components; generating a log that tracks a number of write operations performed to store data to the individual portion of the set of memory components relative to a plurality of requests to program the data to the individual portion of the memory sub-system; and computing, based on the log, a write amplification for the full capacity of the memory sub-system based on a write amplification of the reduced capacity of the memory sub-system.

20. A non-transitory computer-readable storage medium comprising instructions that, when executed by at least one processing device, cause the at least one processing device to perform operations comprising: receiving a request to place a memory sub-system into a write amplification mode; in response to receiving the request, reducing a full capacity of the memory sub-system to a reduced capacity by restricting write operations to an individual portion of a set of memory components; generating a log that tracks a number of write operations performed to store data to the individual portion of the set of memory components relative to a plurality of requests to program the data to the individual portion of the memory sub-system; and computing, based on the log, a write amplification for the full capacity of the memory sub-system based on a write amplification of the reduced capacity of the memory sub-system.

* * * * *